March 1, 1960   J. A. NORTHCOTE ET AL   2,926,479
ROTARY MOWER
Original Filed Sept. 1, 1954

INVENTORS.
JOHN A. NORTHCOTE
DAVID W. DIXON
ATTORNEYS

United States Patent Office 2,926,479
Patented Mar. 1, 1960

2,926,479

ROTARY MOWER

John A. Northcote, Welland, Ontario, and David W. Dixon, Galt, Ontario, Canada, assignors to John Deere Plow Company (Limited), Winnipeg, Manitoba, Canada, a corporation of Canada Original application September 1, 1954, Serial No. 453,453, now Patent No. 2,815,631, dated December 10, 1957. Divided and this application November 25, 1957, Serial No. 698,685

2 Claims. (Cl. 56—25.4)

This application is a division of our copending application, Ser. No. 453,453, filed September 1, 1954 now Patent No. 2,815,631, for Rotary Mower.

The present invention relates generally to agricultural implements and more particularly to tractor-operated rotary mowers or stalk shredders and like implements.

The object and general nature of the present invention is the provision of a new and improved rotary mower or stalk shredder in which the casing or housing of the mower is particularly constructed to accommodate the connection of the rotor with the power take-off shaft of a farm tractor.

Specifically, it is an important feature of this invention to provide a draft hitch structure for connecting an implement with a tractor, wherein a mast section on the implement includes generally forwardly and downwardly divergent walls between which the power take-off shaft of the tractor may extend and be protected thereby while, at the same time the implement may shift laterally and/or vertically relative to the tractor without in any way interfering with the action of the power take-off shaft. Further, it is a feature of this invention to provide means at the lower portion of the mast section to receive the lower links of the hitch connection.

These and other objects and advantages of the present invention will be apparent to those skilled in the art after a consideration of the following detailed description, taken in conjunction with the accompanying drawings, in which.

Figure 1:
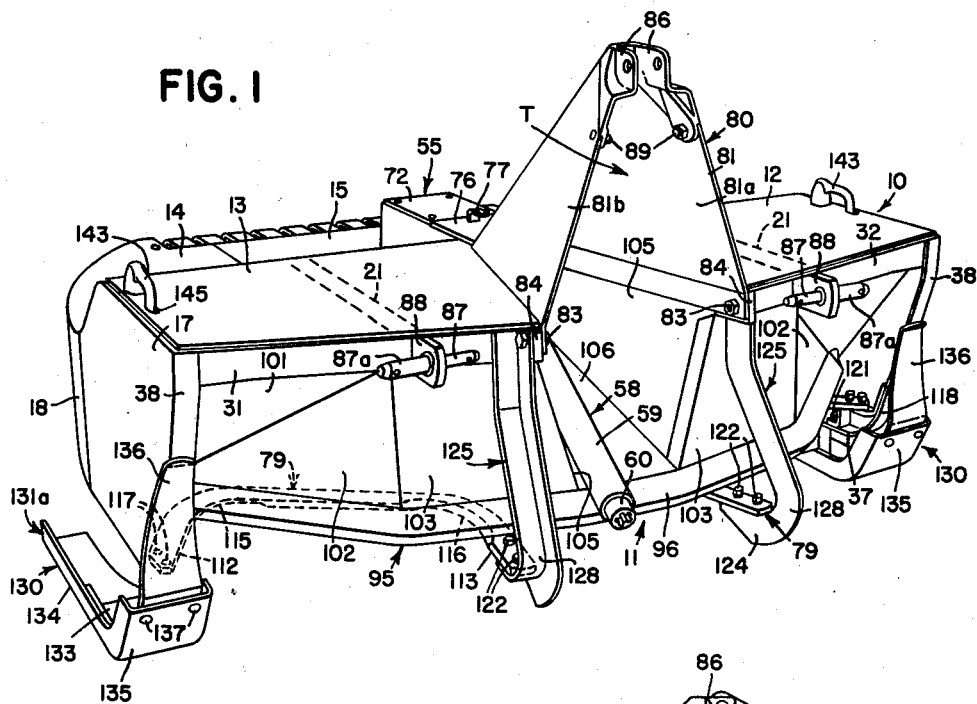
Fig. 1 is a perspective front view of a stalk shredder or rotary mower in which the principles of the present invention have been incorporated.
Figure 2:
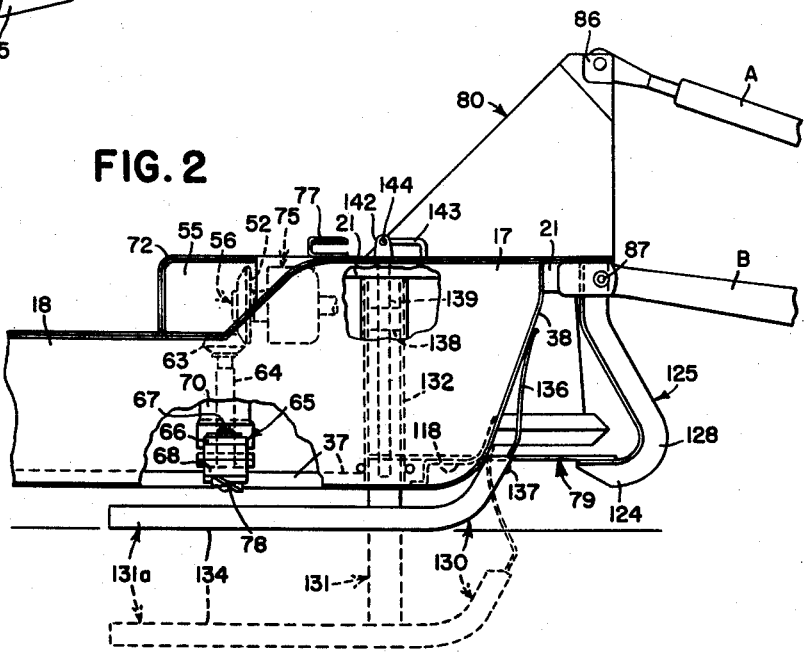
Fig. 2 is a fragmentary side view, with certain parts broken away.

Referring now to the drawings, particularly Figs. 1 and 2, the mower of the present invention comprises a mower body in the form of a casing or housing 10, including a welded framework 11 and suitable enclosure plates including front upper plates 12 and 13, rear upper plates 14 and 15, and side walls formed by plates 17 and 18 at each side of the machine, the plates 18 being curved. The supporting framework 11 includes a pair of main angles 21 disposed in a generally fore-and-aft extending, laterally spaced apart position, with suitable interconnecting cross angles (not shown) extending between the main angles 21. The frame 11 also includes a pair of side angles curved at their rear portions so as to follow the configuration of the mower body and connected at their forward ends to a pair of upper front angles 31 and 32, and a pair of lower side members 37, one at each side of the machine, the forward ends of which are in the form of upturned angle sections 38 fixed to the laterally outer ends of the transverse frame bars 31 and 32.

The generally central portion of the mower body 10 carries a casing 55 in which a bevel gear set 56 is disposed. Connected with the upright bevel gear 52 of the set 56 is a power shaft 58 that includes telescopically associated sections 59 and 60, the latter being adapted to be connected in any suitable way with the power take-off of the tractor to which the mower is adapted to be connected. A horizontal bevel gear 63 is fixed to the upper end of a vertical shaft 64, to the lower end of which a head 65 is fixed, the head 65 including a short bar 66 apertured to receive a pair of bolts 67 by which a knife blade holder 68 is connected to be rotated about the axis of the shaft 64 by power delivered to the mower through the drive shaft 58. The lower section of the casing 55 is formed with a tubular extension 70 in which bearing means, supporting the vertical shaft 64, is disposed. The rear portion of the casing is closed by a removable cover 72 (Fig. 2), and forwardly of the gear case 55 is a slip clutch unit 75, of conventional construction so far as the principles of the present invention are concerned. Access to the clutch 75 is had by means of a removable cover plate 76 having a latch controlling handle 77. Conventionally, the power shaft 58 is connected at its rear end with the forward shaft of the slip clutch unit 75 by any suitable means whereby the power shaft 58 may take an angled position, such as is shown for example, in Fig. 1.

Also forming a part of the mower body 10 is a mast section 80. This member comprises a generally hood-like plate member 81 secured at its lower forward portions, as by bolts 83, to brackets 84 that are fixed to the laterally inner end of the frame angles 31 and 32. At its rear portion the mast section 80 is secured to the central portion of the mower body 10. The uppermost portion of the mast section 80 is formed as a casting and comprises a member having a pair of spaced apart sections 86 that are apertured to receive the upper connector by which the implement is adapted to be connected to the upper link A of a three-link system. The two lower links B of such a system are adapted to be releasably mounted on a pair of spaced apart pins 87 fixed to brackets 88 that are secured, as by welding, to the transverse frame members 31 and 32. The pins 87 have apertured inner and outer ends whereby the pins are adapted to receive the lower links of a three-link system even though the lateral spacing between the two lower links may vary. One way of securing the member 86 to the mast plate 81 is by means of bolts 89. The laterally outer pin portions of the hitch pins 87 are indicated at 87a. The connections between the rear ends of the links A and B and the implement attachment points 86, 87 and 87a are conventionally so constructed and arranged as to provide for universal movement between the links and the implement, and the connections between the forward ends of the links and the tractor (not shown) are conventionally of the same or similar construction.

The mower body 10 is completed by a front shield in the form of wall means 95. Such front wall means comprises a lower front angle 96 arranged with its edge section facing forwardly and bent into generally arcuate shape, as best shown in Fig. 1. The ends of the front lower angle member 96 are welded to the adjacent portions of the mower frame. A pair of front sheets, each having sections 101, 102, and 103, at each side of the mower complete the front wall, together with side and bottom sheets 105 and 106 that, with the upper mast section 80, form a generally forwardly diverging tunnel T through which the power shaft 58, referred to above, extends, whereby the drive shaft is capable of both lateral and vertical swinging therein with no possibility of being fouled by grass or other material cut by the mower.

The working unit of the mower of the present invention includes the rotary shaft 64, blade holder 68, and cutting blade means 78 fixed or connected to the end of the blade holder 68 and a pair of cooperating stationary gatherer knives 79. Any one of several forms of cutting blades may be used and each of the gatherer knives 79 comprises a U-shaped member formed generally of flat bar stock and having apertured ends arranged to extend generally forwardly. As best shown in Fig. 1, each knife member 79 comprises a U-shaped knife having generally forwardly extending leg sections 112 and 113, these sections being apertured, and a pair of sharpened sections 115 and 116, one formed at the lower side of the bar while the other is formed at the upper side. By virtue of this construction, the knives 111 are reversible from right to left, and vice-versa. The laterally outer leg portion 112 of each knife is fixed to the mower frame through a pair of bolts 117 that fix the knife to the associated laterally outer side support 118 which, as best shown in Fig. 2, comprises a generally Z-shaped member having one end connected, as by a bolt 121, to the associated side frame angle 37, the upper portion being bolted to the side frame angle section 38. The laterally inner leg portion 113 of each knife is apertured to receive a pair of bolts 122 by which the knife is secured to the lower rearwardly turned end 124 of a generally vertically disposed knife support 125, there being two of such supports, as best shown in Fig. 1. The upper end of each knife support is secured, as by the bolt 83, to the laterally inner end of the adjacent upper transverse frame bar 31 or 32. Each knife support 125 is provided with a curved section 128 that is shaped so as to clear the front frame angle 96.

The mower body and the rotating blades carried thereby are supported at the desired position relative to the ground surface by means of a pair of vertically adjustable skid units 130. Each of the units 130 includes a standard section 131 and a skid section 131a. The standard section 131 is made up of a generally tubular member 132, rectangular in cross section, and a foot portion 133 that is bolted or otherwise secured to an elongated channel-like member 134 that forms the principal portion of the skid section 131a, the member 134 having an upturned sled runner front portion 135. A spring member 136 is bolted, as at 137, to the front end of the skid section 134 and serves to close the gap between the skid and the adjacent portion of the front of the mower frame so as to prevent trash and the like from passing between the skid and the frame, particularly when the mower is adjusted for a relatively high position, as indicated in dotted lines in Fig. 2.

Any suitable means may be provided for adjusting the vertical position of the skid units 130 relative to the mower frame which they support. For example, the tubular member 132 of each skid unit 130 may be provided with a screw-threaded trunnion 138 into which the lower threaded end of an adjusting rod 139 extends. The upper end of the rod 139 is pinned or fixed in any suitable way to a crank swivel member 142 to which a crank member 143 is pivotally connected, as at 144. For holding any desired adjustment, the upper housing sheet, 12 or 13, may be provided with an opening 145 to receive the outer end of the crank member 143.

The side walls 81a and 81b converge upwardly and rearwardly, as shown in Fig. 1, and cooperate with the downwardly converging lower side sheets or walls 105 to form the tunnel T that, as best shown in Fig. 1, is of a forwardly diverging nature through which the drive shaft 58 passes without danger of being fouled by the shredded material cut by the knives 78. In other words, the space enclosed by the upper walls 105 and 106 receives the power shaft unit 58 and accommodates lateral and vertical swinging thereof while at the same time, serving to prevent cut and shredded material from coming into contact with the shaft 58.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In an agricultural implement adapted to be connected with a tractor having a power take-off shaft, the improvement that comprises a casing adapted to be connected to the tractor for generally lateral and vertical movement relative thereto, a part carried by the casing and adapted to be driven by power from the power take-off shaft, means forming a generally forwardly extending tunnel carried by the said casing, said tunnel comprising walls enclosing a space lying both above and below the upper part of said casing except that said space is open at the front, a drive shaft connected at its rear portion with said driven part to drive the latter, said drive shaft being disposed within said space and shiftable generally laterally and vertically therein, and means on the upper portion of said tunnel to receive hitch means connecting the casing with the tractor.

2. The invention defined in claim 1, further characterized by said shaft-receiving tunnel means comprising lower downwardly converging and forwardly diverging wall means lying in depending relation with respect to the casing top wall and upper forwardly diverging and upwardly extending wall means connected with said first mentioned lower wall means.

References Cited in the file of this patent

UNITED STATES PATENTS

| | | |
|---|---|---|
| 1,831,658 | Groenig et al. | Nov. 10, 1931 |
| 2,612,017 | Jarmin | Sept. 30, 1952 |
| 2,634,571 | Lawrence et al. | Apr. 14, 1953 |
| 2,659,191 | Miller et al. | Nov. 17, 1953 |
| 2,751,737 | Herod | June 26, 1956 |